(12) United States Patent
Ito et al.

(10) Patent No.: US 7,203,601 B2
(45) Date of Patent: Apr. 10, 2007

(54) WORK MOUNTING DEVICE

(75) Inventors: Takayuki Ito, Yamanashi (JP);
Hiromitsu Takahashi, Yamanashi (JP)

(73) Assignee: FANUC Ltd., Yamanashi (JP)

( * ) Notice: Subject to any disclaimer, the term of this patent is extended or adjusted under 35 U.S.C. 154(b) by 331 days.

(21) Appl. No.: 10/911,380

(22) Filed: Aug. 4, 2004

(65) Prior Publication Data
US 2005/0035519 A1  Feb. 17, 2005

(30) Foreign Application Priority Data
Aug. 5, 2003  (JP) .............................. 2003-287110

(51) Int. Cl.
*G06F 19/00* (2006.01)
(52) U.S. Cl. .......................................... 702/33; 706/17
(58) Field of Classification Search ................. 702/33, 702/150–153, 181, 183, 187, 188; 706/17, 706/21
See application file for complete search history.

(56) References Cited

U.S. PATENT DOCUMENTS

| | | | |
|---|---|---|---|
| 5,304,906 A | | 4/1994 | Arita et al. |
| 5,672,044 A | * | 9/1997 | Lemelson ................ 414/744.3 |
| 5,936,369 A | | 8/1999 | Iwashita et al. |

FOREIGN PATENT DOCUMENTS

| | | |
|---|---|---|
| JP | 62-282880 | 8/1987 |
| JP | 7-314365 | 12/1995 |

\* cited by examiner

*Primary Examiner*—Edward Raymond
(74) *Attorney, Agent, or Firm*—Drinker Biddle & Reath LLP (57) ABSTRACT

A work mounting device in which an operation for teaching a robot to mount a work on a work mounting member is automated. The work is gripped by a hand placed on an arm tip portion of the robot and the operation for mounting the work on the work mounting member is taught. A plurality of distance sensors are disposed on the work mounting member or the hand. Distances between each sensor and the work or distances between each sensor and the work mounting member are measured. A robot controller maintains an attitude of the robot so that the distances detected by the distance sensors are uniform and, at the same time, allows the work to approach the work mounting member so that a plurality of holes of the work are engaged with a plurality of respective protrusions of the work mounting member. Based on the distance data detected by the distance sensors, a disturbance estimation observer, a load torque on motors for each axis or the like, the movement of the robot is stopped automatically when the work reaches a position where the work is in contact with the work mounting member or is very close to contact therewith. The position and attitude of the robot at this time is taught.

7 Claims, 5 Drawing Sheets

WORK MOUNTING DEVICE

BACKGROUND OF THE INVENTION

1. Field of the Invention

The present invention relates to a work mounting device, for mounting a work on a work mounting member using a robot, and, in particular, it relates to a work mounting device that can be utilized for teaching the attitude of a hand to mount the work properly.

2. Description of the Related Art

Conventionally, in order to create a robot program to allow a robot to handle a work and mount it on a work mounting member, which is provided with a plurality of work support sections, it is necessary to teach the position and attitude when the work is mounted while, first, moving a hand installed in the robot up to the proximity of the work support sections of the work mounting member by manually feeding the robot and, then, fine-tuning the attitude of the hand by manual feeding of the robot so that the work comes into uniform contact with all the work support sections.

Thus, this adjustment operation, to repeat one trial and error operation after another, is usually very cumbersome and, in particular, when the work is large, it is burdensome even for experts and, further, it is very difficult for nonexperts to perform this operation. Therefore, it is a major cause of an increase in time for teaching the program to the robot. Nevertheless, the fact of the matter is that no suitable method to solve the difficulties in teaching has been developed.

In this connection, though no publicly-known literature similar to the present invention has been found, a well-known disturbance observer, that is utilized for detecting contact between the work and the work mounting member as described below, is described, for example, in U.S. Pat. No. 5,304,906 issued on Apr. 19, 1994 to Arita, et al. and U.S. Pat. No. 5,936,369 issued on Aug. 10, 1999 to Iwashita, et al.

SUMMARY OF THE INVENTION

In view of the above problem, it is an object of the present invention to provide a work mounting device that is useful for performing a teaching operation simply, and in a short time, to allow a robot to handle a work and mount it on a work mounting member. Further, through the provision of such work mounting device, the present invention reduces the time for teaching the robot and, thus, the burden on an operator so that even nonexperts can perform teaching tasks easily.

The present invention solves the above problems by automating an adjustment operation, which is conventionally performed by manual feeding to repeated trial and error operations as described above, by means of a method for controlling attitude of a hand using distance information obtained by distance measuring means disposed at a plurality of positions on the work mounting member or on a work holding section, that is, the hand (or, in other words, by means of a robot attitude controller). More specifically, the present invention is applied to a device that holds a work by a work holding section or a hand, which is installed in a robot controlled by a robot controller, and mounts the held work on the work mounting member. The present invention may have various aspects as follows:

A work mounting device according to a basic aspect of the present invention comprises: a work holding section for holding a work; a work mounting member for mounting said work thereon, which has a plurality of contacting regions that come into contact with a plurality of contacting regions on said work separately when said work is mounted thereon; a plurality of distance measuring devices, each of which has a measurement reference point and which provide a plurality of distance data representing distances between said work held by said work holding section and said work mounting member based on each of said measurement reference points; a storage section for storing said plurality of distance data provided by said plurality of distance measuring devices; a driving mechanism for moving said work holding section so that said work held by said work holding section approaches said work mounting member; and an attitude control section that, while said work holding section is operating, controls said driving mechanism to adjust the attitude of said work holding section based on said plurality of distance data stored in said storage section so that distances between said contacting regions of said work and said work mounting member, which are to eventually come into contact with each other, are maintained uniformly and, on the other hand, stops the movement of said work holding section when a predetermined condition is satisfied while said attitude is being adjusted.

Here, the plurality of distance measuring devices are provided at a plurality of locations on the work mounting member and the devices measure the minimum distances between each measurement reference point and the work. Preferably, the plurality of distance measuring devices are disposed in the contacting regions of the work mounting member.

Alternatively, the plurality of distance measuring devices may be provided at a plurality of locations on the work holding section and the devices may measure the minimum distances between each measurement reference point and the work mounting member.

Here, the predetermined condition may be determined as a condition concerning the distance between the work and the work mounting member and, more specifically, it may be determined based on a difference between an evaluation index indicating how close the work and the work mounting member are to each other and a predetermined threshold for such evaluation index. Alternatively, the predetermined condition may be determined based on whether contact between the work and the work mounting member is detected or not. In this case, the presence or absence of the contact can be determined, for example, based on a disturbance estimation observer provided in the attitude control section or, by detecting variation of load on the driving mechanism, it can be determined based on the detection result.

BRIEF DESCRIPTION OF THE DRAWINGS

The above and other objects, features and advantages of the present invention will be made more apparent, from the following description of the preferred embodiments thereof, with reference to the accompanying drawings, wherein.

DETAILED DESCRIPTION

Figure 1:
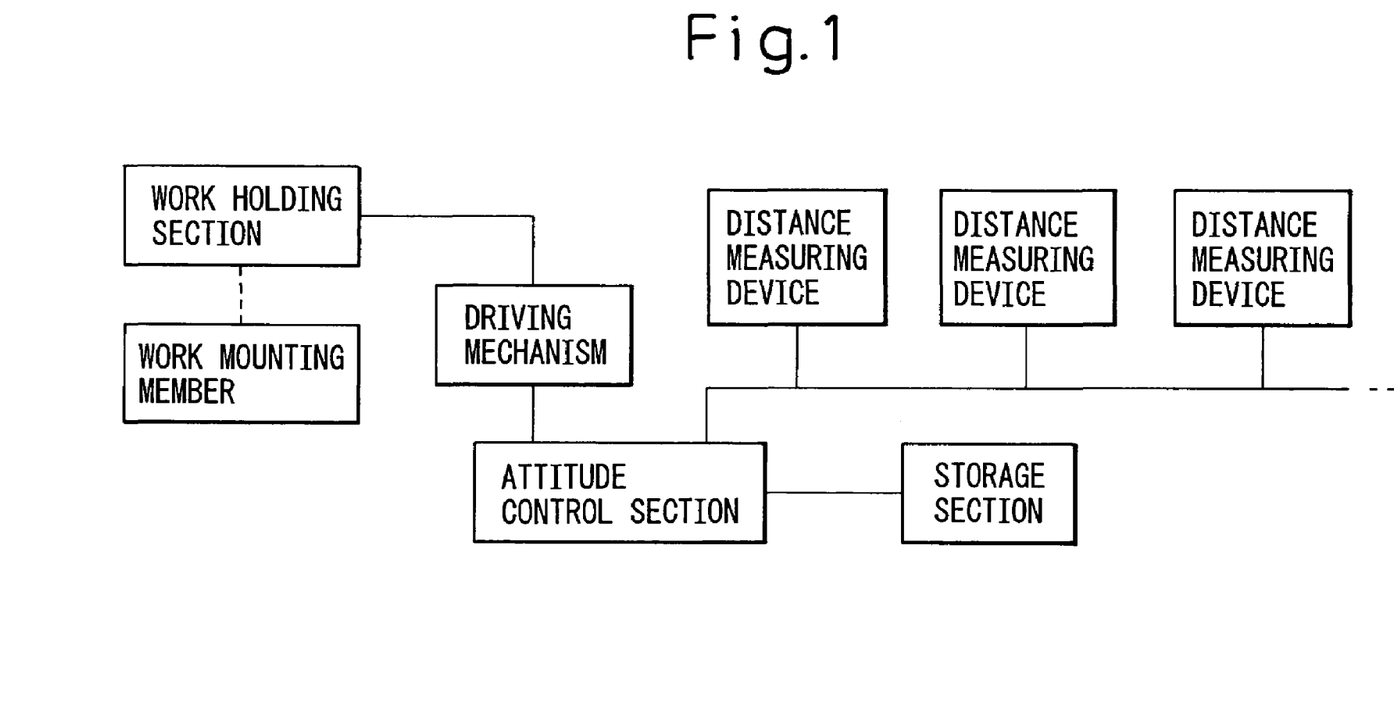
FIG. 1 is a block diagram for describing a schematic configuration of a work mounting device of the present invention.
Figure 2:
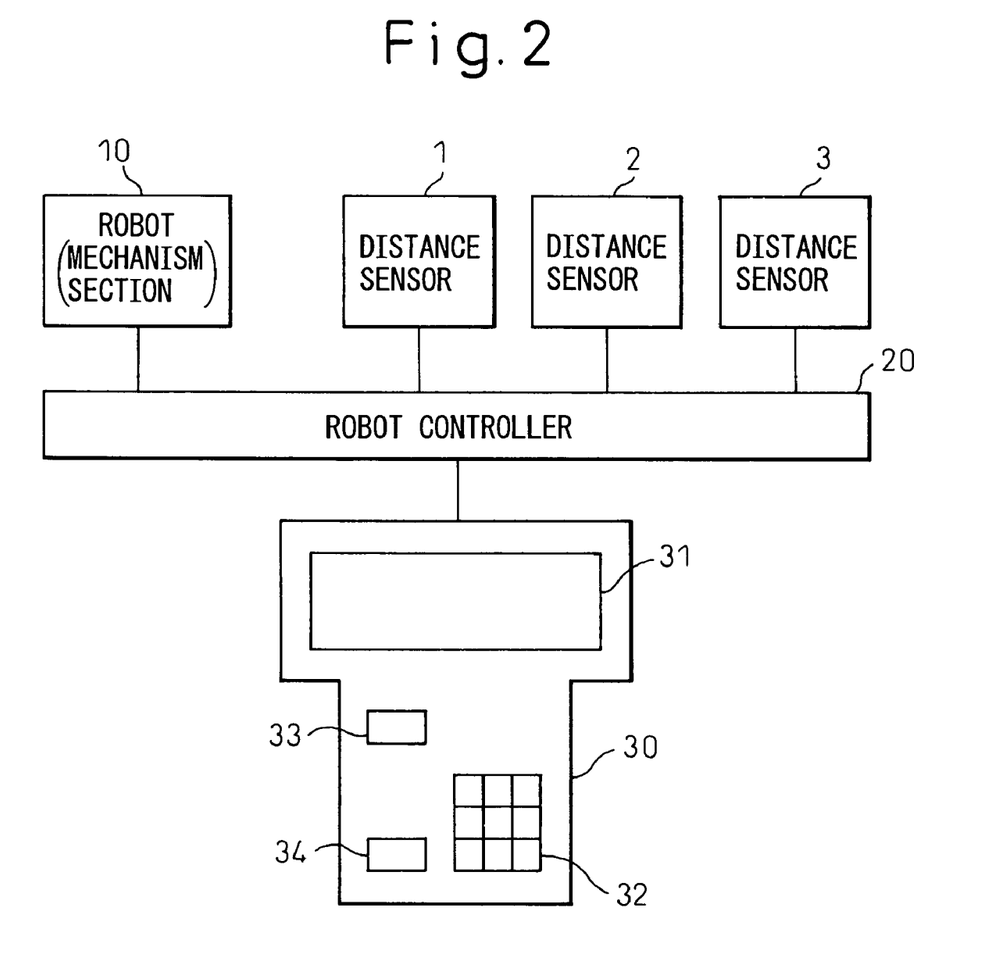
FIG. 2 is a block diagram for describing a schematic configuration of a preferred embodiment of the work mounting device of the present invention.

FIG. 1 is a block diagram for describing a schematic configuration of a work mounting device of the present invention and FIG. 2 is a block diagram for describing a schematic configuration of a preferred embodiment of the work mounting device of the present invention.

As shown in FIG. 1, a work mounting device comprises: a work holding section for holding a work; a work mounting member for mounting said work thereon, which has a plurality of contacting regions that come into contact with a plurality of contacting regions on said work separately when said work is mounted thereon; a plurality of distance measuring devices, each of which has a measurement reference point and which provide a plurality of distance data representing distances between said work held by said work holding section and said work mounting member based on each of said measurement reference points; a storage section for storing said plurality of distance data provided by said plurality of distance measuring devices; a driving mechanism for moving said work holding section so that said work held by said work holding section approaches said work mounting member; and an attitude control section that, while said work holding section is operating, controls said driving mechanism to adjust the attitude of said work holding section based on said plurality of distance data stored in said storage section so that distances between said contacting regions of said work and said work mounting member, which are to eventually come into contact with each other, are maintained uniformly and, on the other hand, stops the movement of said work holding section when a predetermined condition is satisfied while said attitude is being adjusted.

An embodiment of the work mounting device shown in FIG. 2 is comprised of: a robot (a mechanism section) 10 equipped with a work holding section or hand (not shown in FIG. 2; see FIG. 3 or 4 described below); a teaching control panel 30; a number of (three in the shown example) distance measuring devices or distance sensors 1–3; and an attitude control section or a robot controller 20 connected to these elements. The robot controller 20 does not particularly differ from a typical robot system except that the robot controller 20 is connected to the distance sensors 1–3 via an interface for the sensors (not shown) and that the robot controller 20 is equipped with software for performing a process shown in a flow chart of FIGS. 5 and 6 described below by using data obtained by the distance sensors 1–3.

Further, the robot controller 20, in a well-known manner, comprises a disturbance estimation observer for a speed loop of servomotor (driving mechanism) control of each robot axis that can estimate and output a disturbance torque according to a torque command and an actual speed. A disturbance estimation observer that can be used in the present invention has been described, for example, in U.S. Pat. No. 5,304,906 issued on Apr. 19, 1994 to Arita, et al. and U.S. Pat. No. 5,936,369 on Aug. 10, 1999 to Iwashita, et al., the disclosure of which is incorporated herein by reference. Alternatively, in place of the disturbance estimation observer, a current values to the motor of each axis may be monitored and output.

The teaching control panel 30 is connected to the robot controller 20 via an interface for the teaching control panel in a typical manner and provided with: a display 31, a jog key (manual feed key) 32, a teaching key 33 and an approaching key 34. As well known, the jog key (manual feed key) 32 allows the robot 10 to perform translational or rotational motion specified by the operator gradually. The teaching key 33 is a key for storing current position coordinates (x, y, z, p, w, r) (x, y and z are related to the translational motion and p, w and r are related to the rotational motion) in a storage section or memory in the robot controller 20 by pushing it down when the robot is positioned and stopped. Further, the approaching key 34 provides a means for manually inputting commands to start and continue the process shown in the flow chart of FIGS. 5 and 6 described below. In this connection, in addition to these functions by means of the keys, the teaching control panel 30 is further provided with means for editing and modifying programs, setting various parameters and performing an emergency stop. Further, the teaching control panel 30 may optionally be provided with features for capturing data on distances measured by the distance sensors 1–3 and displaying the data on the display 31.

Figure 3:
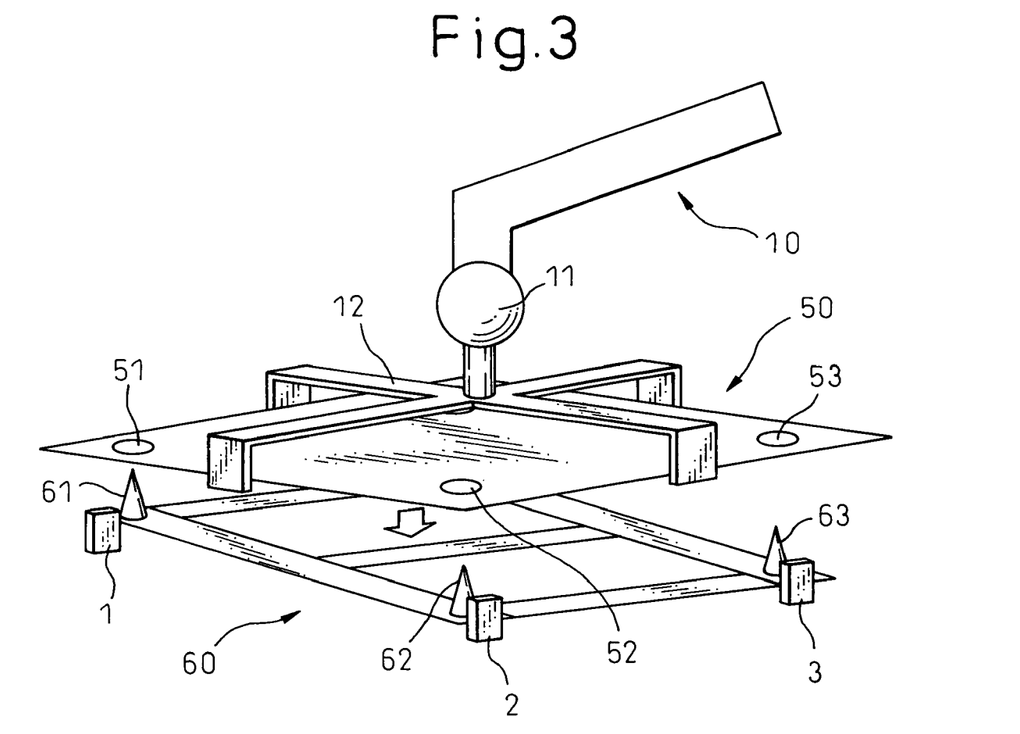
FIG. 3 is an outline diagram showing how a work gripped by a hand and a work mounting member are disposed in an embodiment in which distance sensors are mounted on the side of the work mounting member.
Figure 4:
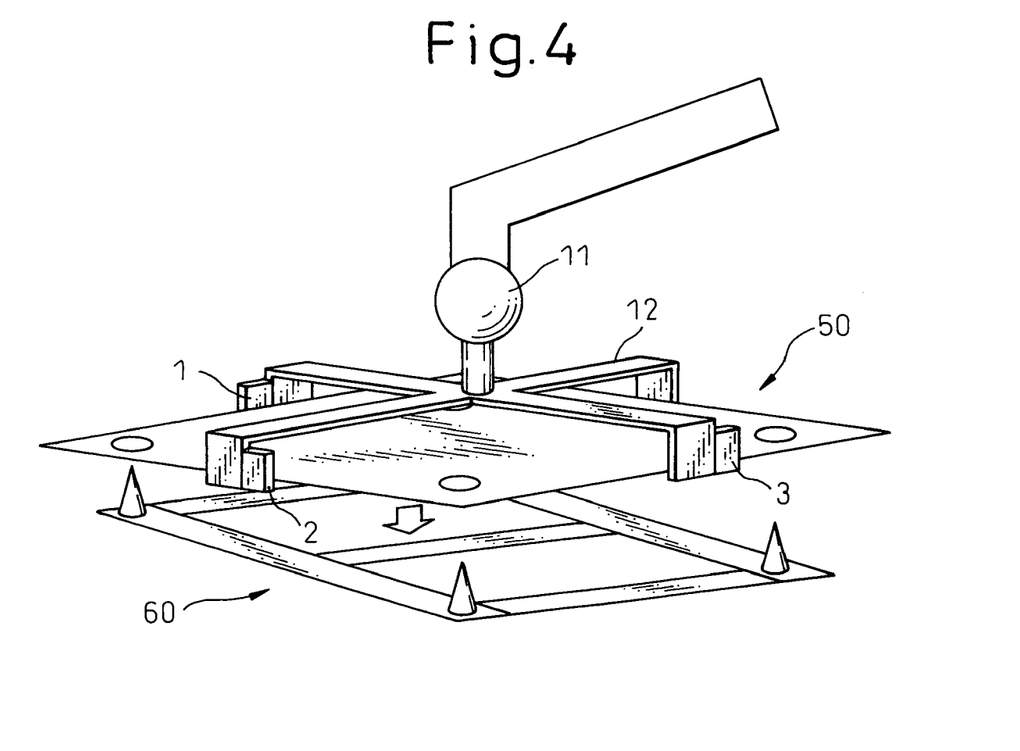
FIG. 4 is an outline diagram showing how the work gripped by the hand and the work mounting member are disposed in an embodiment in which the distance sensors are mounted on the side of the hand.

Next, FIGS. 3 and 4 are outline diagrams showing how a work gripped by a hand and a work mounting member in the work mounting device, which is schematically shown in FIG. 2, are disposed in two cases in which the distance sensors are mounted at different positions from each other, wherein FIG. 3 shows the case in which the distance sensors are mounted on the side of the work mounting member and FIG. 4 shows the case in which the distance sensors are mounted on the side of the hand. In these figures, a reference numeral 11 designates an arm tip portion of the robot 10, on which the hand 12 is placed. The hand 12 grips the work 50 as shown and, in this embodiment, an operation for teaching the robot to mount the work 50 on the work mounting member 60 is considered.

The work 50 shown in this example is provided with holes 51–53 that are formed at three corners thereof and the work mounting member 60 is provided with protrusions 61–63 that are formed at positions precisely corresponding to the holes 51–53. Therefore, a region around the hole 51 and the protrusion 61, a region around the hole 52 and the protrusion 62, and a region around the hole 53 and the protrusion 63, respectively, correspond and eventually make contact with each other.

The positions of the distance sensors 1–3 on the work mounting member 60 or the hand 12 are selected so that they are not in line with one another. Further, when the distance sensors 1–3 are mounted on the work mounting member 60, the distance sensors 1–3 are preferably, but not necessarily, placed in regions that correspond and eventually make contact with the work (in the neighborhood of the protrusions 61–63 in this example), as shown in FIG. 3. Still further, when the distance sensors 1–3 are mounted on the hand 12, the distance sensors 1–3 are preferably, but not necessarily, placed in the neighborhood of the contact points where the work is gripped, as shown in FIG. 4.

Hereinafter, a procedure for teaching a mounting operation on the work mounting member 60 by using the work mounting device shown in FIGS. 2 and 3 or in FIGS. 2 and 4. Here, for convenience, it is assumed that the robot 10 grips the work 50 by the hand 12 and resides in a position somewhat apart from the work mounting member 60 (out of measurement range of the distance sensors 1–3) in its initial state.

(1) Preliminary Approach

First, the operator manipulates the jog key 32 of the teaching control panel 30 to move the robot 10 so that the work 50 is located in the neighborhood of a position substantially directly above the work mounting member 60, as shown in FIG. 3 or 4. For convenience, this movement is referred to as a preliminary approach. The hand 12 (the robot 10) preferably takes an attitude substantially same as the eventual attitude to mount the work 50. In this example, this attitude corresponds to a state in which distances between the holes 51–53 and the corresponding protrusions 61–63 are substantially equal to one another.

In this connection, the operation for this preliminary approach may be performed by executing a program that has been created in advance. Further, in order to check whether the preliminary approach has been performed properly, measurement values of the distance sensors 1–3 are preferably displayed on the display 31 in this step so as to check whether each distance sensor 1–3 can measure the distance between itself and the work 50 (in the case of FIG. 3) or the distance between itself and the work mounting member 60 (in the case of FIG. 4) and whether the measurement values of the distance sensors 1–3 are reasonable values that do not differ from one another too much (for example, each measurement value falls within ±20% of the average measurement values). If the measurement values differ from one another too much or the values cannot be measured, a measure such as readjustment of the preliminarily approached position must be taken.

(2) Final Approach/Mounting Operation

After the preliminary approach is completed, an operation is performed to allow the work 50 to approach the work mounting member 60 to reach a position where the work 50 is mounted on or is very close to being mounted on the work mounting member 60. For convenience, this operation is referred to as a final approach/mounting operation. Conventionally, this operation has been performed through an adjustment operation in which the operator manually feeds the work 50 (or manipulates the jog key 32) to allow the work 50 to approach the work mounting member 60 while keeping the work 50 parallel to the work mounting member 60 (at this time, all the measurement values of each sensor are equal to one another). As described above, this adjustment operation was not easy even for experts but, in this embodiment, it can be performed automatically only by pushing down the approaching key 34 of the teaching control panel 30.

Figure 5:
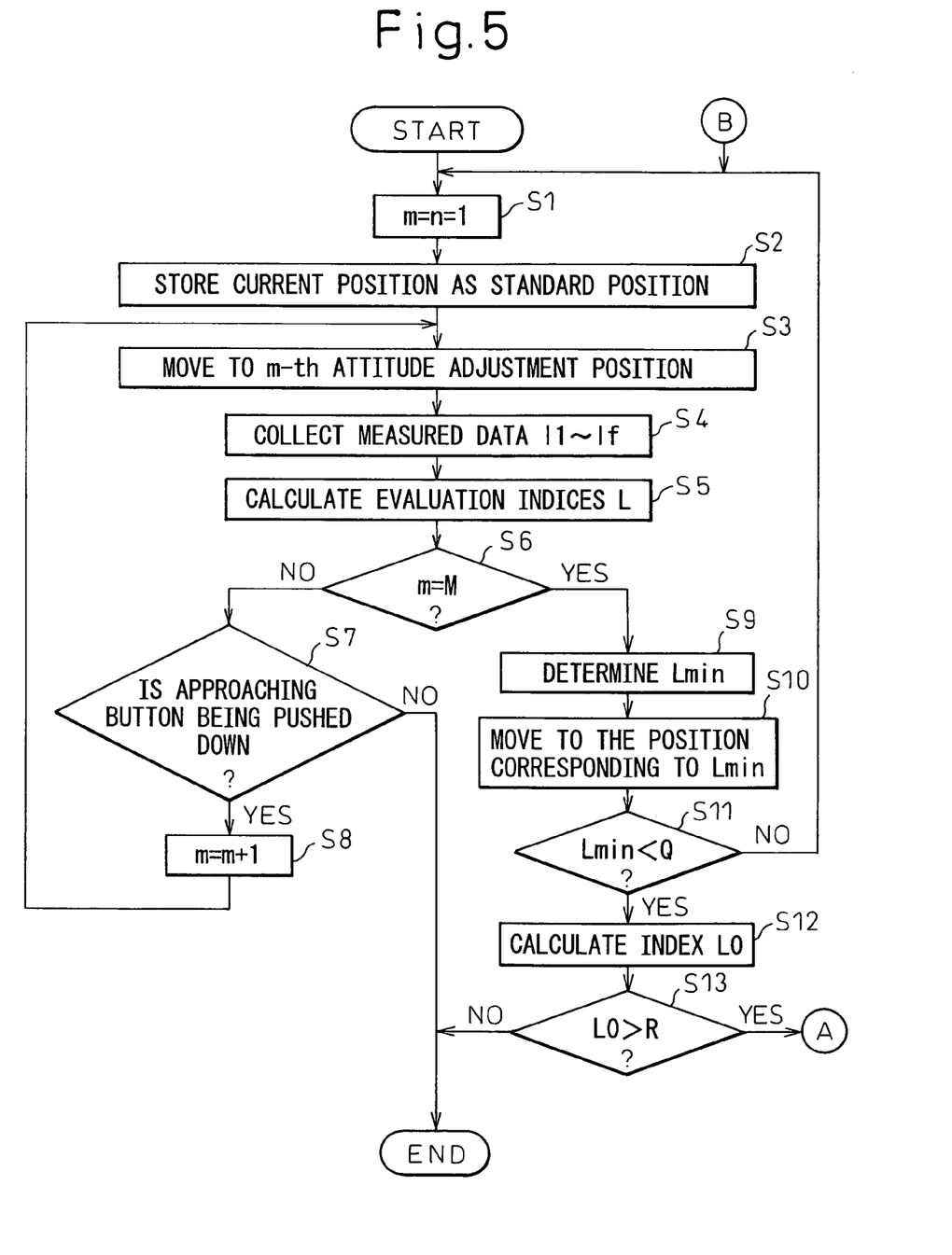
FIG. 5 is the first half of a flow chart showing a schematic process for controlling a final approaching/mounting operation.
Figure 6:
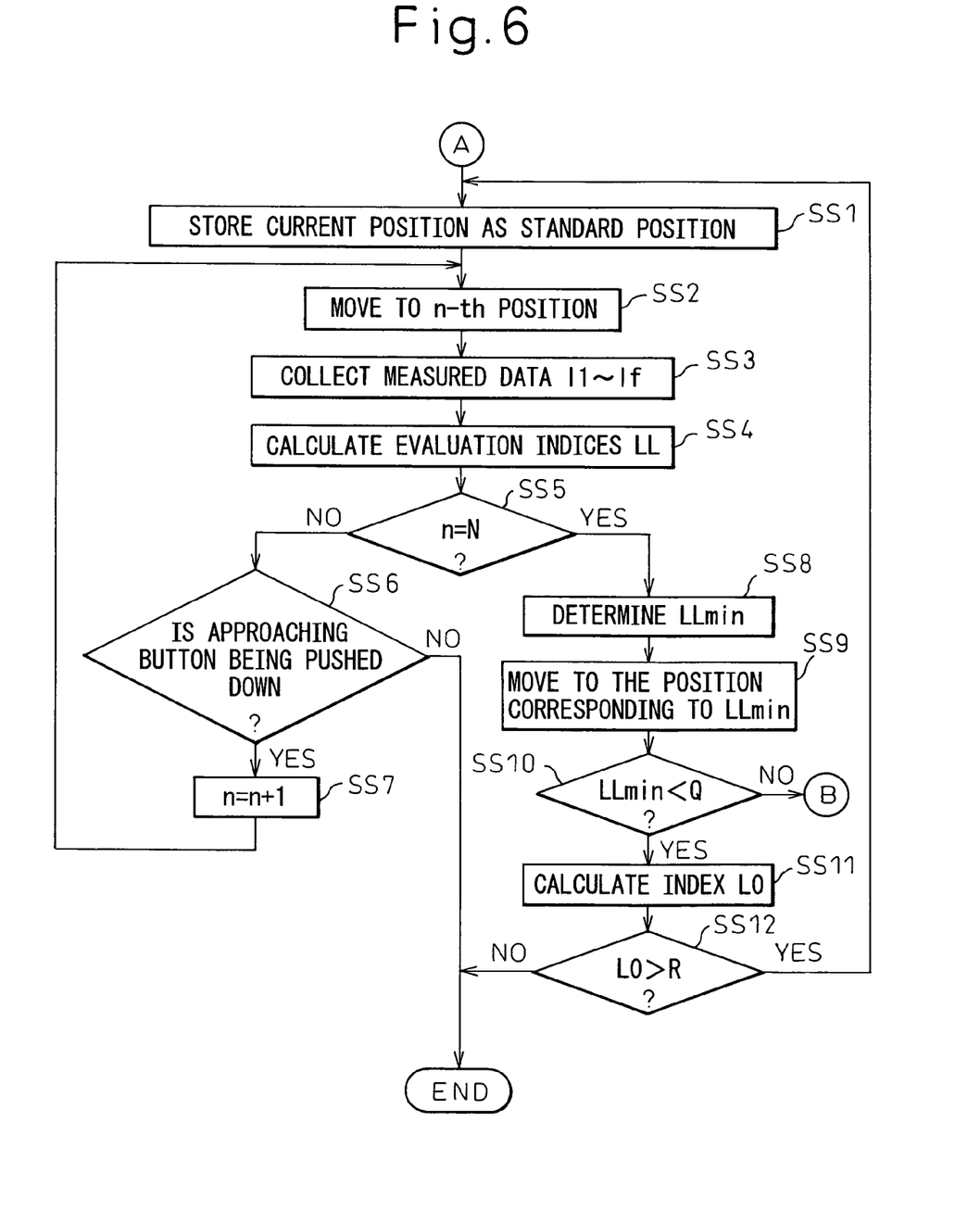
FIG. 6 is the second half of the flow chart showing the schematic process for controlling the final approaching/mounting operation.

More specifically, once the approaching key 34 is pushed down, the robot controller 20 controls the position and the attitude of the robot 10 to allow the work 50 to approach the work mounting member 60 while maintaining a proper attitudinal relationship (a parallel relationship in this example) between the work 50 and the work mounting member 60. FIGS. 5 and 6 are a flow chart showing a schematic process for this control, wherein FIG. 5 is the first half showing steps that are mainly related to attitude control (control of attitudes in relation to a tool coordinate system) and FIG. 6 is the second half showing steps that are mainly related to position control (translational motion of a tool tip point). A basically identical algorithm is used in either of FIGS. 3 and 4 and, therefore, the case in which the distance sensors are attached to the work mounting member (FIG. 3) will be described here. The main points of each step are as follows:

Step S1: Set an index m for the attitude control and an index n for the position control described below to initial values (m=n=1).

Step S2: Store current position coordinates (the position when the preliminary approach described above is completed) as standard position coordinates.

Step S3: Move the robot to the m-th attitude adjustment positions. Here, the "m-th attitude adjustment positions" are determined as follows:

(a) the 1st attitude adjustment position is the standard position itself. Therefore, only when m=1, this step S3 is skipped but, at this time, a startup command specifying that "movement is zero" is output;

(b) the 2nd attitude adjustment position (m=2) is a position that is rotated from the standard position about the X-axis of the tool coordinate system by a predetermined very small angle ($\Delta w$). Assuming that the attitude components of the standard position are ($w_{st}$, $p_{st}$, $r_{st}$), the attitude components of this 2nd attitude adjustment position are ($w_{st}+\Delta w$, $p_{st}$, $r_{st}$);

(c) the 3rd attitude adjustment position (m=3) is a position that is rotated about the Y-axis of the tool coordinate system by a predetermined very small angle ($\Delta p$) ($w_{st}$, $p_{st}+\Delta p$, $r_{st}$);

(d) the 4th attitude adjustment position (m=4) is a position that is rotated about the Z-axis of the tool coordinate system by a predetermined very small angle ($\Delta r$) ($w_{st}$, $p_{st}$, $r_{st}+\Delta r$); and (e) the 5th attitude adjustment position (m=5) is a position that is rotated about the X-axis of the tool coordinate system by an angle twice as large as the predetermined very small angle $\Delta w$ ($2\Delta w$) ($w_{st}+2\Delta w$, $p_{st}$, $r_{st}$).

Hereinafter, in a similar manner, assuming a positive integer g in advance and, then, adjustment attitudes ($w_{st}+i\Delta w$, $p_{st}+j\Delta p$, $r_{st}+k\Delta r$) corresponding to all combinations (i, j, k), where $-g \leq i \leq g$, $-g \leq j \leq g$, $-g \leq k \leq g$ (i, j, k are integers), are generated by labeling m in a one-to-one relationship. The total number of the generated adjustment attitudes is $(2g)^3$ and the maximum value M of the index m is $M=(2g)^3+1$.

In this connection, if a signal indicating that the work 50 is in contact with the work mounting member 60 is output during the movement in step S3, the robot is stopped urgently. For example, if the disturbance torque estimated by the disturbance estimation observer described above or monitored current values of each axis exceed predetermined upper limit values, the robot is stopped urgently.

Step S4: In every attitude taken in step S3, load outputs of each distance sensor into the robot controller 20 to collect measured distance data 1l–1f. Here, the number of the sensors is f=3 and, therefore, 3 items of the distance data are collected and the data for each sensor is stored by labeling with the corresponding indices m.

Step S5: Calculate evaluation indices L for checking appropriateness of the attitudes. For example, L is calculated by the following equation (1):

$$L = \Sigma (l_a - l_b)^2 \qquad (1)$$

(where the subscripts a and b indicate that $l_a$ and $l_b$ are measurement values by the a-th distance sensor and the b-th distance sensor different from the a-th sensor, respectively, and the summation $\Sigma$ should be taken for all combinations of $1 \leq a \leq f$ and $1 \leq b \leq f$).

If f=3, the above equation (1) takes the following form:

$$L=(l_1-l_2)^2+(l_2-l_3)^2+(l_3-l_1)^2 \quad (2)$$

The calculated values L are stored by labeling with the indices m.

Step S6: Check whether the steps S3–S5 are completed for all the adjustment attitudes. If not completed, the process proceeds to step S7 or, if completed, the process proceeds to step S9.

Step S7: Check whether the approaching key 34 (see FIG. 2) is being pushed down. If it is being pushed down, the process proceeds to step S8 or, if it is not being pushed down, the process terminates. Thus, the operator can select to terminate/continue the approaching/mounting operation at any time.

Step S8: Add 1 to the attitude adjustment index m and return to step S3.

Step S9: Determine the minimum $L=L_{min}$.

Step S10/Step S11: Move the robot to the attitude corresponding to the index m giving the minimum $L=L_{min}$. At this point in time, it can be considered that the attitude adjustment for 1 cycle is completed. But, in order to ascertain that the attitude adjustment satisfies minimum appropriateness, the process proceeds to step S11. An acceptable upper limit value Q is determined for $L_{min}$ in advance. If $L_{min}<Q$, the process proceeds to step S12 or, otherwise, the process returns to step S1 and, then, step S2 and the subsequent steps are repeated to readjust the attitude. Here, it is to be noted that the "current position" in step S2 at this time is the position to which the robot has been moved in the preceding step S10. Thus, the "standard attitude" for the next cycle is an attitude at least after a certain attitude adjustment has been performed though it did not pass the step S11. Therefore, it can be expected with a high probability that the attitude of the robot will pass step S11 after a number of trials.

Step S12: Calculate an evaluation index $L_0$ for checking how the work 50 approaches the work mounting member 60 with regard to the index m giving $L_{min}$. $L_0$ can be calculated by the following equation (3):

$$L_0=(l_1+\ldots+l_f)/f \quad (3)$$

If f=3, the above equation (3) takes the following form:

$$L_0=(l_1+l_2+l_3)/3 \quad (4)$$

Step S13: Compare $L_0$ with a predetermined threshold R for the evaluation index $L_0$ and, if $L_0$ is not more than R, terminate the approaching/mounting operation. Further, indicate the result on the display 31. After recognizing the result, the operator releases the approaching key 34 and pushes the teaching key 33 down to teach the current position. If $L_0>R$, the process proceeds to step SS1 (the process moves into the flow chart of FIG. 6 from the reference numeral A). In this connection, the value R is preferably set to be equal to or slightly larger than a value of $L_0$ obtained when all the holes 51–53 of the work 50 are engaged with the protrusions 61–63 and the work 50 is mounted on the work mounting member 60 completely.

Step SS1: Store the current position (the position when step S12 is completed) as the standard position.

Step SS2: Move the robot to the n-th translational adjustment positions. Here, the "n-th translational adjustment positions" are determined as follows:

(a) the 1st translational adjustment position (n=1) is a position to which the tool tip point is translated from the standard position in the direction of the X-axis by a predetermined very small distance ($\Delta x$). Assuming that the positional components of the standard position are ($x_{st}$, $y_{st, zst}$), the positional components of this 1st translational adjustment position are ($x_{st}+\Delta x$, $y_{st}$, $z_{st}$);

(b) the 2nd translational adjustment position (n=2) is a position to which the tool tip point is translated from the standard position in the direction of the Y-axis by a predetermined very small distance ($\Delta y$) ($x_{st}$, $y_{st}+\Delta y$, $z_{st}$);

(c) the 3rd translational adjustment position (n=3) is a position to which the tool tip point is translated from the standard position in the direction of the Z-axis by a predetermined very small distance ($\Delta z$) ($x_{st}$, $y_{st}$, $z_{st}+\Delta z$)

(d) the 4th translational adjustment position (n=4) is a position to which the tool tip point is translated from the standard position in the direction of the X-axis by a distance twice as large as the predetermined very small distance ($\Delta x$) ($x_{st}+2\Delta x$, $y_{st}$, $z_{st}$); and (e) hereinafter, in a similar manner, assuming a positive integer h in advance and, then adjustment positions ($x_{st}+i\Delta x$, $y_{st}+j\Delta y$, $z_{st}+k\Delta z$) corresponding to all combinations (i, j, k), where $-h \leq i \leq h$, $-h \leq j \leq h$, $-h \leq k \leq h$, are generated by labeling n in a one-to-one relationship. The total number of the generated adjustment attitudes is $(2h)^3$ and the maximum value N of the index n is $N=(2h)^3$.

In this connection, if a signal indicating that the work 50 is in contact with the work mounting member 60 is output during the movement in step SS2, the robot is stopped urgently in a similar manner to the case in step S3 described above.

Step SS3: In every position taken in step SS2, load outputs of each distance sensor into the robot controller 20 to collect measured distance data l1–lf. Here, the number of the sensors is f=3 and, therefore, 3 items of the distance data are collected and the data for each sensor is stored by labeling with the corresponding indices n.

Step SS4: Calculate evaluation indices LL for checking uniformity of the approach. LL can be calculated by the same equation as the equation (1) or (2) described above, for example. The calculated value LL is stored by labeling with the indices n.

Step SS5: Check whether the steps SS2–SS4 are completed for all the translational adjustment positions. If not completed, the process proceeds to step SS6 or, if completed, the process proceeds to step SS8.

Step SS6: Check whether the approaching key (see FIG. 2) is being pushed down. If it is being pushed down, the process proceeds to step SS7 or, if it is not being pushed down, the process terminates. Thus, the operator can select to terminate/continue the approaching/mounting operation at any time.

Step SS7: Add 1 to the translational adjustment index n and return to step SS2.

Step SS8: Determine the minimum $LL=LL_{min}$.

Step SS9/Step SS10: Move the robot to the position corresponding to the index n giving the minimum $L=L_{min}$. At this point in time, it can be considered that the translational position adjustment for 1 cycle is completed. Here, in order to ascertain that the uniformity of the approach satisfies minimum requirements, the process proceeds to step SS10. An acceptable upper limit value Q is determined for $LL_{min}$ in advance. Here, the same value as the upper limit value of $L_{min}$ used in step S11 is adopted. If $LL_{min}<Q$, the process proceeds to step SS11 or, otherwise, the process returns to step S1 and, then, step S2 and the subsequent steps are repeated to readjust the attitude (the process moves into the flow chart of FIG. 5 from the reference numeral B). But, here, it is to be noted that the "current position" in step S2 at this time is the position to which the robot has been moved in the preceding step SS9.

Step SS11: Calculate the evaluation index $L_0$ for checking how the work 50 approaches the work mounting member 60 with regard to the index n giving $L_{min}$. $L_0$ can be calculated by the equation (3) or (4) set forth above.

Step SS12: Compare $L_0$ with the predetermined threshold R and, if $L_0$ is not more than R, terminate the approaching/mounting operation. Further, indicate the result on the display 31. After recognizing the result, the operator releases the approaching key 34 and pushes the teaching key 33 down to teach the current position. If $L_0 > R$, step SS1 and the subsequent steps are performed again. At this time, the "current position" in step SS2 is the position to which the robot has been moved in the preceding step SS9. Therefore, it can be expected with a high probability that the position of the robot will pass the step S11 after a number of trials.

As described above, the operator can teach the robot an appropriate position and attitude to allow the work 50 to approach the work mounting member 60 uniformly and to be mounted thereon only by pushing the approaching key 34 down continuously for an adequate time period (till the display 31 indicates that the approaching/mounting operation is completed).

In this connection, though distance information is used as the reference to decide to stop the robot, other information may be used. For example, the disturbance estimation observer described above may be used for detecting the completion of the approaching/mounting operation of the work 50 onto the work mounting member 60 to terminate the approaching/mounting operation. More specifically, as described above, the disturbance estimation observer may be configured with regard to a speed loop of servomotor control of the robot so that a disturbance torque can be estimated based on a torque command and an actual speed and, if the magnitude of the estimated disturbance torque exceeds a predetermined value, it may be considered that the work 50 is in contact with the work mounting member 60 and the approaching/mounting operation may be terminated. Alternatively, current values of motors for each axis may be monitored and, if the values exceed a predetermined value, it may be considered that the work 50 is in contact with the work mounting member 60 and the approaching/mounting operation may be terminated.

As described above, in this application, as a plurality of distance measuring means are disposed on the work mounting member or the hand, a positional relationship between the work mounting member and the work can be known based on the distance information obtained thereby and the attitude of the hand (the attitude of the robot) can be controlled automatically so that corresponding contacting regions of the work and the work mounting member approach each other immediately before contact uniformly and the robot can be stopped when it is determined that the adequate approach or contact occurs based on the distance data, the disturbance estimation observer, the load torque and the like. Therefore, most of cumbersome tasks that have been required of the operator conventionally become unnecessary. Thus, when the work mounting device of the present invention is utilized, the manual feeding operation of the robot that is required of the operator may be only a simple operation to allow the corresponding contacting regions of the work and the work mounting member to approach each other within a certain distance range (an effective measuring range of the distance sensors).

After such a rough approach is completed, the operator can move the work toward support sections of the work mounting member automatically through key manipulation and the like. During this movement, the robot controller determines the distances between each support section and the work continuously from the data output from the distance measuring means and controls the attitude of the hand of the robot so that the distances between each support section (each corresponding contacting region) and the work are reduced uniformly. Finally, the movement is stopped when any contact is detected. As the attitude of the hand at this point in time is equivalent to the one that the experts determined finally after time-consuming trial and error by manual feeding in the prior art, the result of the present invention is that the teaching operation has become easy for experts and nonexperts alike. In this connection, various distance measuring devices such as a laser distance sensor, an ultrasonic distance sensor, an optical distance sensor using infrared light and a stereographic sensor using two cameras are well-known and can be adopted as appropriate.

According to the present invention, in a robot for handling a work, attitude adjustment of a hand can be automated when the work is mounted on a work mounting member. Therefore, the time for teaching the robot and, thus, the burden on the operator, can be reduced. Further, even nonexperts can perform teaching tasks easily.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A work mounting device comprising:
a work holding section for holding a work;
a work mounting member for mounting said work thereon, said work mounting member having a plurality of contacting regions that come into contact with a plurality of contacting regions on said work separately when said work is mounted thereon;
a plurality of distance measuring devices, each of said plurality of distance measuring devices having a measurement reference point and which provide a plurality of distance data representing distances between said work held by said work holding section and said work mounting member based on each of said measurement reference points;
a storage section for storing said plurality of distance data provided by said plurality of distance measuring devices;
a driving mechanism for moving said work holding section so that said work held by said work holding section approaches said work mounting member; and
an attitude control section that, while said work holding section is operating, controls said driving mechanism to adjust the attitude of said work holding section based on said plurality of distance data stored in said storage section so that distances between said contacting regions of said work and said work mounting member, are maintained uniformly and, wherein the movement of said work holding section is stopped when a predetermined condition is satisfied while said attitude is being adjusted.

2. The work mounting device as set forth in claim 1, wherein the distance measuring devices are provided at a plurality of locations on the work mounting member and measure the minimum distance between each measurement reference point and the work.

3. The work mounting device as set forth in claim 2, wherein the distance measuring devices are disposed in the contacting regions of the work mounting member.

4. The work mounting device as set forth in claim 1, wherein the distance measuring devices are provided at a plurality of locations on the work holding section and measure the minimum distance between each measurement reference point and the work mounting member.

5. The work mounting device as set forth in claim 1, wherein the predetermined condition is determined based on a difference between an evaluation index indicating how close the work and the work mounting member are to each other and a predetermined threshold for such evaluation index.

6. The work mounting device as set forth in claim 1, wherein the work mounting device further comprises a disturbance estimation observer, the predetermined condition is determined based on whether contact between the work and the work mounting member is detected or not, and the presence or absence of the contact is determined based on the disturbance estimation observer.

7. The work mounting device as set forth in claim 1, wherein the predetermined condition is determined based on whether contact between the work and the work mounting member is detected or not, and the presence or absence of the contact is determined by detecting variation of load on the driving mechanism.

* * * * *